United States Patent [19]

Rehfeld et al.

[11] Patent Number: 5,368,917
[45] Date of Patent: Nov. 29, 1994

[54] ACOUSTIC PROTECTIVE GLAZING FOR A VEHICLE

[75] Inventors: Marc Rehfeld, Ezanville; Michel Canaud, Paris, both of France

[73] Assignee: Saint Gobain Vitrage International, Paris, France

[21] Appl. No.: 145,662

[22] Filed: Nov. 4, 1993

Related U.S. Application Data

[63] Continuation of Ser. No. 491,595, Mar. 12, 1990, abandoned.

[30] Foreign Application Priority Data

Mar. 10, 1989 [FR] France .................... 8903137

[51] Int. Cl.$^5$ .................. B32B 7/02; B60J 1/02
[52] U.S. Cl. .................... 428/215; 428/34; 428/415; 428/425.6; 428/430; 52/788; 181/286; 181/289; 296/96.14
[58] Field of Search ........ 428/415, 417, 418, 34, 428/212, 213, 215, 332, 425.6, 430; 156/107, 109; 52/788, 790, 789; 296/96.14; 181/286, 289, 290

[56] References Cited

U.S. PATENT DOCUMENTS

| 3,783,084 | 1/1974 | Quench | 428/34 |
| 4,011,356 | 3/1977 | Lambert et al. | 428/34 |
| 4,614,676 | 9/1986 | Rehfeld | 428/34 |
| 4,680,206 | 7/1987 | Yoxon et al. | 52/788 |

FOREIGN PATENT DOCUMENTS

| 2480347 | 10/1981 | France . |
| 2529609 | 1/1984 | France . |
| 3517581 | 9/1986 | Germany . |
| 2096682 | 10/1982 | United Kingdom . |

*Primary Examiner*—Donald J. Loney
*Attorney, Agent, or Firm*—Oblon, Spivak, McClelland, Maier & Neustadt

[57] ABSTRACT

An acoustic glazing intended for land transportation vehicles and including first and second glass sheets separated by an interlayer region, wherein the acoustic transmission loss differs at most by 5 dB from a figure increasing of 9 dB per octave from 800 to 2000 Hz and of 3 dB per octave above that. As examples, double glazings or laminated glazings are presented featuring an interlayer with a pronounced damping. The acoustic glazing will then operate to effectively eliminate aerodynamic noises in moving vehicles.

6 Claims, 3 Drawing Sheets

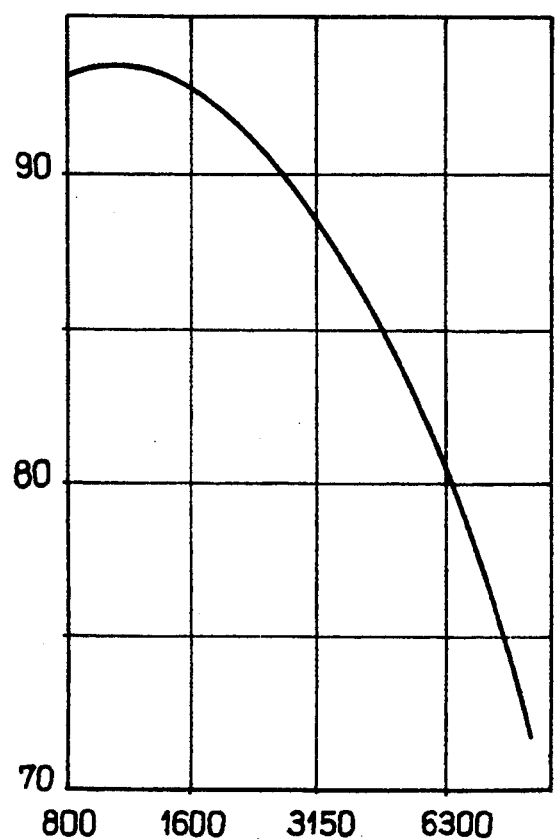
FIG._1
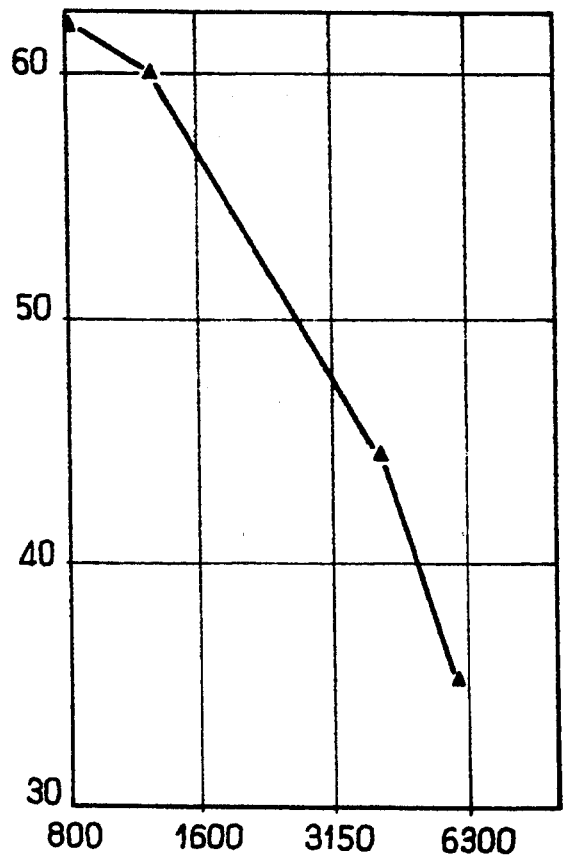
FIG._2

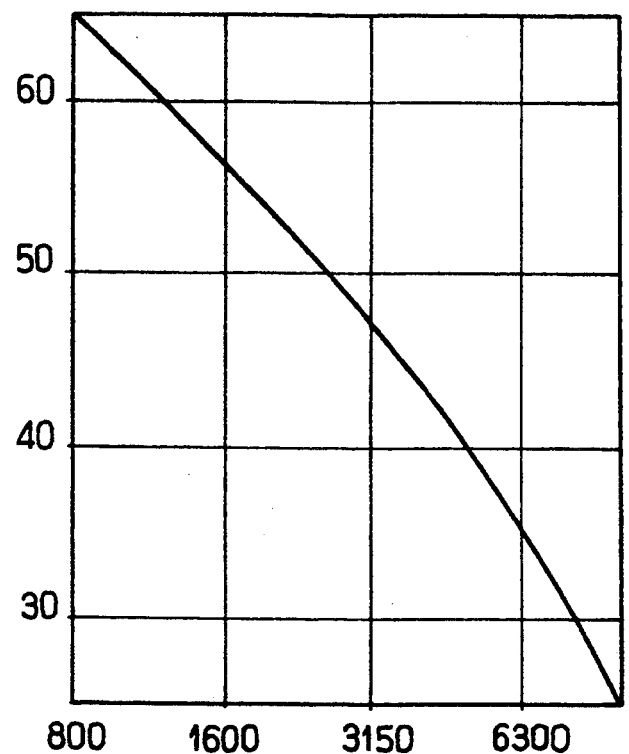
FIG_3
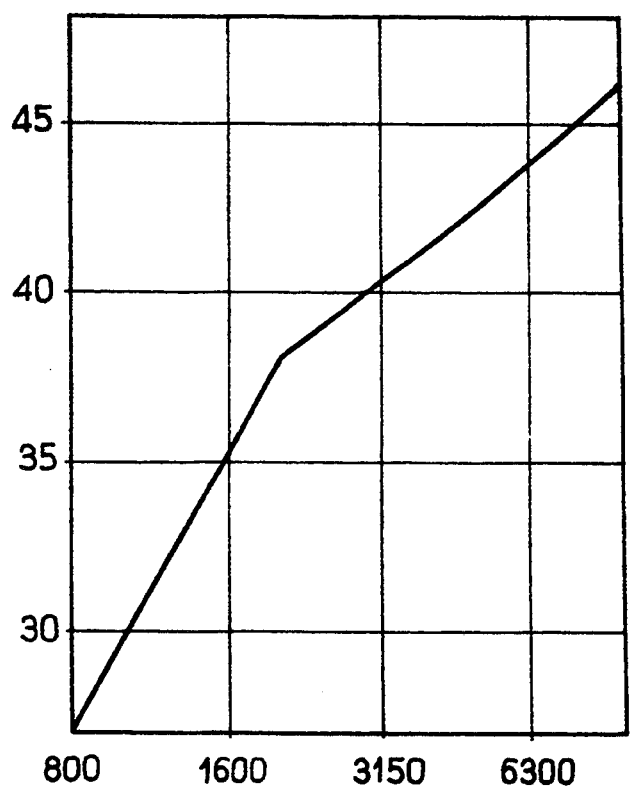
FIG_4

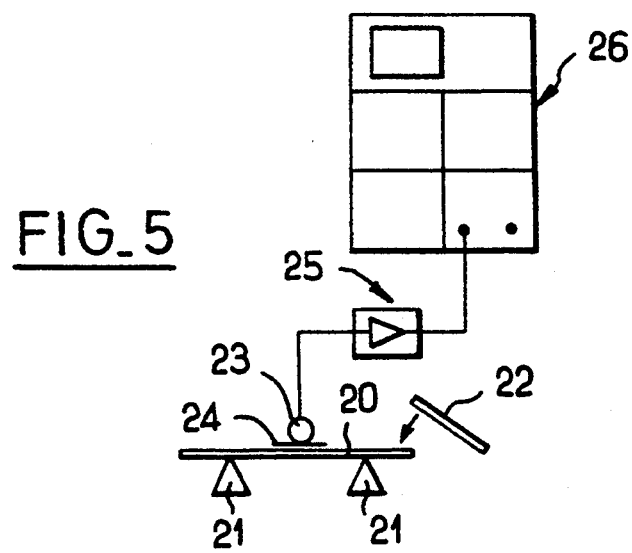
FIG_5
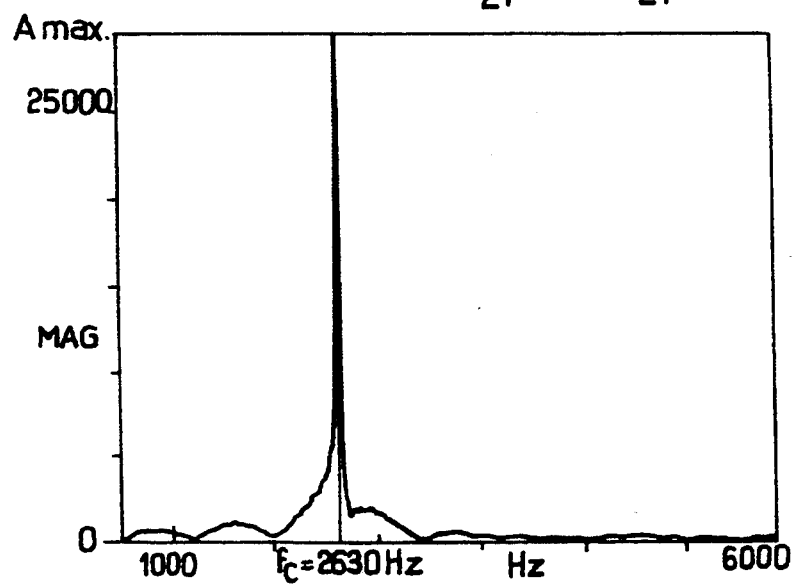
FIG_6
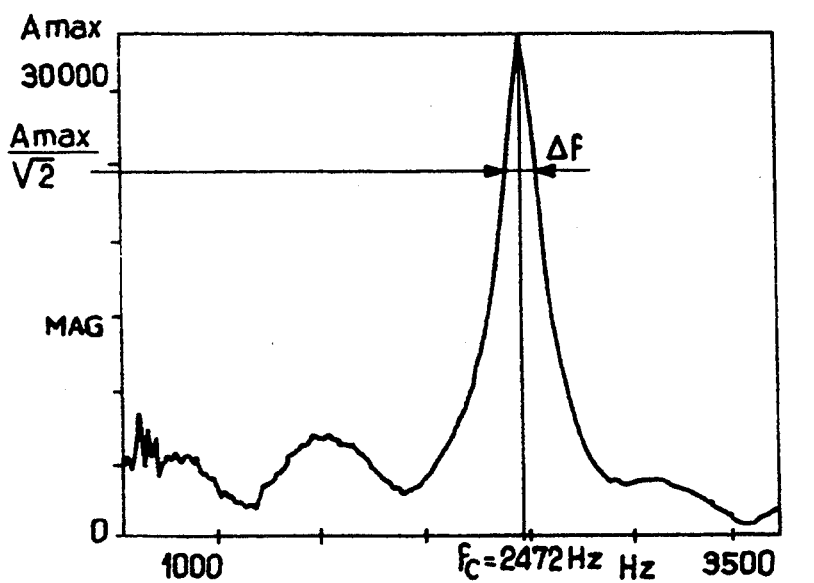
FIG_7

ACOUSTIC PROTECTIVE GLAZING FOR A VEHICLE

This application is a continuation of application Ser. No. 07/491,595, filed on Mar. 12, 1990, now abandoned.

BACKGROUND OF THE INVENTION

1. Field of the Invention

The present invention relates to a glazing for a vehicle—and more particularly for a motor vehicle—having improved acoustic insulation performances, and especially in relation to noises of aerodynamic origin.

2. Discussion of the Background

Of all the qualities contributing to comfort in modern transportation vehicles such as trains and automobiles, silence has become decisive. Actually, other sources of annoyance such as of mechanical, heat, or visibility origin, etc. have been gradually overcome. But the improvement of acoustical comfort presents new difficulties as the noises themselves, such as engine noises, and driving or suspension noises, have already been treated at their origin or during their propagation, either by air (absorbing coatings in particular) or by solids (elastomer connecting parts, for example). The aerodynamic noises created by the friction of air moving over the vehicle have been able, at least in part, to be treated at their source, i.e., to save energy, shapes have been changed, penetration in the air has been improved and turbulences which are themselves sources of aerodynamic noise have been reduced.

However, both in the design of the cars of rapid modern trains and in that of automobiles, what could be done to treat the sources of aerodynamic noises has been done and reducing what noises remain, whether the noises are those of a perfect laminar flow or the reduction of the turbulences, requires disproportionate measures whose cost would be incompatible with the profitability of the design studied.

Of the walls of the vehicle that separate the source of outside aerodynamic noise from the interior space where the passenger is located, the glazings are the most difficult to treat. Fibrous or pasty absorbent materials reserved for opaque walls cannot be used and for practical or weight reasons, thicknesses cannot be thoughtlessly increased.

SUMMARY OF THE INVENTION

Accordingly, one object of the present invention is to provide a new and improved glazing that achieves good insulation from noises of aerodynamic origin.

Another object is to provide a novel glazing which achieves good insulation, as above noted, but which does not have either its weight or thickness significantly increased.

These and other objects are achieved according to the present invention by providing a novel glazing including two glass sheets having an interlayer air space or plastic film provided therebetween. The glazing of the present invention, for frequencies greater than 800 hertz, has acoustic transmission losses which do not differ for any frequency, by more than 5 decibels from a reference figure decreasing of 9 dB per octave up to 2000 Hz and of 3 dB per octave at higher frequencies. Moreover, the standard deviation $\sigma$ in the differences of the acoustic transmission loss in relation to the preceding reference figure remains advantageously less than 4 dB.

In a preferred embodiment, the glazing includes two monolithic glass sheets separated by an air space and whose thicknesses differ from one another by more than 20%. This is the case for glass sheets with respective 2.6 mm and 3.2 mm thicknesses for example or, as another example, for glass sheets with 3.2 mm and 3.9 mm thicknesses.

In a variant, the difference of the thicknesses reaches approximately 40% by using glass sheets with respective thicknesses of about 2 mm and 3 mm, for example.

The preceding insulating glazings will preferably have an interlayer air space of about 3 mm, for example.

In another embodiment a glazing according to the present invention includes a laminated glazing whose interlayer has a flectural bending at its critical frequency that is greater than 0.15. The thicknesses of the two glasses can be identical. According to this variant, this common thickness will be 2.2 mm.

A way of achieving the desired damping includes using as the interlayer a compound comprising on the one hand a thermoplastic resin resulting from the copolymerization of 80% to 98.5% by weight of vinyl chloride and 1% to 10% of glucydyl methacrylate as well as 0.5% to 10% ethylene and, on the other hand, of 10% to 40% by weight of a plasticizer.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 1 is a graph illustrating the medium and high frequency portions of the spectrum of standard road noise;

FIG. 2 is a graph illustrating the spectrum of noise measured inside an automobile at a medium speed;

FIG. 3 is a graph illustrating the noise spectrum that is desired to be reached inside a car at high speed;

FIG. 4 is a graph illustrating the acoustic transmission loss according to the present invention that makes it possible to obtain the desired spectrum; and FIG. 5 details a testing system that makes it possible to determine the damping at the critical frequency of the resins that make it possible to produce laminated glazings according to the present invention.

FIGS. 6 and 7 present graphical results obtained by utilizing the testing system shown in FIG. 5.

DESCRIPTION OF THE PREFERRED EMBODIMENTS

Noises which are perceived on the inside of land vehicles moving at a high speed have multiple origins but each one, depending on its origin, affects a determined zone of the spectrum of acoustic frequencies. Generally, in an automobile, for example, noises of mechanical, engine or transmission origin produce sounds of low frequencies and even, infrasounds; the noises of aerodynamic origin, due to frictions of the vehicle in the air, produce sounds of higher frequencies.

When it is desired to study these noises at their source, in the immediate vicinity and outside the wall of a moving vehicle, extreme experimental difficulties due to the frictions of the microphones in the air are faced and therefore, it is necessary to use indirect testing methods such as, for example, the so-called "double weighing" method. This method consists in making two successive measurements of the noise on the inside of the vehicle, the first with the vehicle stopped, and the source of noise on the outside being a predetermined perfectly known noise signal. This first measurement makes it possible to gain access to the characteristics of the transmission loss of the entire body. A second measurement is made at a selected speed and under real conditions. Utilizing a reverse calculation, it is possible to determine what precisely the spectrum is of the outside noise, whose effect is measured on the inside.

Applying this method to a comfortable car, i.e., one in which the noises other than those of aerodynamic origin have been reduced as much as possible, shows that at a speed on the order of 130 km/hr, this outside aerodynamic noise is not much different in the range of its high frequency components, from a standard road noise signal as it is ordinarily proposed. Thus, the standard road noise of the French standard NF-S 31051 is, in particular, very close to this outside aerodynamic noise. Such a noise expressed in dB(A) is represented in FIG. 1 (the very high frequencies are extrapolated there).

Since noises of aerodynamic origin are due essentially to the flow of air over the walls of the vehicle, it can furthermore be expected that the spectrum of the aerodynamic noises of a railroad car are not very different from that of a road vehicle. Tests have shown that this is indeed the case. It follows that the following developments relate to glazings intended both for railroad cars and road vehicles.

The idea of acoustic comfort is a matter of each individual's appreciation. Studies made on acoustic comfort in vehicles traveling at high speeds show that the vehicles are considered silent when two conditions are met, first, average sound level is low, and second, the curve representing the noise spectrum is even, without any frequency emerging from the group. Thus, BRYAN, for example ("A Tentative Criterion For Acceptable Noise Levels In Passenger Vehicles"—JOURNAL OF SOUND AND VIBRATION 1977 - 48 (4) p. 525) presents a measured noise spectrum in a vehicle traveling at 100 km/hr and considered by users as silent. FIG. 2 reproduces the spectrum in question expressed in dB(A).

To achieve conditions of acoustic comfort at high speed, the present invention therefore settled on an objective that takes into consideration the preceding observations. Actually, the present invention operates on the finding that if a noise spectrum of the same nature as the one considered as giving an impression of silence in a medium speed vehicle were successfully obtained on the inside of a vehicle traveling at high speed, acoustic comfort would be assured. FIG. 3 presents the objective to be reached expressed in dB(A). This is the noise spectrum that is desired to be obtained on the inside of a vehicle traveling at a high speed, i.e., for which the outside noise would have a spectrum comparable to that of FIG. 1.

The present invention operates on the finding that the glazing of a vehicle meeting these conditions would have to have an acoustic transmission loss whose representative curve deviates as little as possible from the curve reproduced in FIG. 4. It is characterized by a slope of 9 decibels per octave from 800 to 2000 hertz and of 3 decibels per octave from 2,000 to 10,000 hertz. The level of the curve (36 dB at 1600 hertz in FIG. 4) is much less important for the subjective comfort of the passengers than its shape, i.e., it is its two successive slopes and especially its evenness which guarantees the absence of the emergence of isolated frequencies. A curve that is overall offset parallel to that shown in FIG. 4 downward could be less satisfactory but would be in accordance with the present invention and, nevertheless, would give a good impression of comfort. Likewise, a curve offset parallel to that shown in FIG. 4 toward the upper isolations would improve comfort without going outside the scope of the present invention.

Of the glazings able to meet the preceding criterion, there are single sheet window glasses, insulating glazings or laminated glazings.

TABLE I

| Frequency (Hz) | Acoustic transmission loss for different types of glazing (dB) | | | | | | | |
|---|---|---|---|---|---|---|---|---|
| | 0 | 1 | 2 | 3 | 4 | 5 | 6 | 7 |
| 800 | 27 | 31 | 33 | 32 | 32 | 32 | 27 | 27 |
| 1000 | 30 | 35 | 36 | 35 | 36 | 36 | 30 | 31 |
| 1250 | 33 | 36 | 37 | 36 | 36 | 36 | 31 | 33 |
| 1600 | 36 | 35 | 38 | 36 | 37 | 37 | 34 | 35.5 |
| 2000 | 39 | 33 | 39 | 36 | 38 | 37.5 | 38 | 38.5 |
| 2500 | 40 | 32 | 39 | 35 | 39 | 38 | 41 | 40.5 |
| 3150 | 41 | 33 | 39 | 35 | 39 | 37.5 | 40 | 39 |
| 4000 | 42 | 35 | 38 | 35 | 40 | 38.5 | 39 | 37.5 |
| 5000 | 43 | 38 | 36 | 38 | 39 | 39 | 42 | 40 |
| 6300 | 44 | 40 | 38 | 41 | 41 | 41 | 43 | 42 |
| 8000 | 45 | 45 | 41 | 44 | 43 | 44 | 43 | 44.5 |
| 10000 | 46 | 47 | 45 | 49 | 47 | 48 | 46 | 47.5 |

Table I exhibits the acoustic transmission loss factors for these different types of glazings. These are in order:
No. 0: the transmission loss of the invention, at 9 dB then 3 dB per octave,
No. 1: glass plate (optionally tempered) 5 mm thick
No. 2: laminated glass 2.2-1.5-2.6 with polyurethane resin
No. 3: laminated glass 2.2-0.76-2.2 with PVB at 25° C.
No. 4: laminated glass 2.2-0.76-2.2 with PVB at 35° C.
No. 5: laminated glass 2.2-1.1-2.2 with special PVC resin
No. 6: insulating glazing 2.0 (3) 3.2 and
No. 7: insulating glazing 2.6 (3) 3.2

(The preceding figures correspond to the thicknesses in millimeters, these thicknesses are given by way of example, they could be considerably modified without going outside the scope of the present invention. This remark applies to glazings 4, 5, 6 and 7).

The measurements of these acoustic attenuation factors have been performed according to the standard ISO-140 in an installation in accordance with that standard on samples with dimensions 80×50 cm.

The sample in No. 1 is of soda lime silica single sheet window glass 5 mm thick which has undergone a standard heat tempering.

Samples 3 and 4 are laminated glazings with a polyvinyl butyral (PVB) base, the thickness of the film being 0.76 mm. To cause the acoustical performances to vary, in particular "the damping at bending at the critical frequency" which will be defined below, the temperature of the sample was modified at the time of measurement.

Likewise, samples 2 and 5 are laminated glasses whose interlayer is different in nature to obtain different acoustical properties. The interlayer of sample No. 2 is a thermoplastic polyurethane with a thickness of 1.5 mm of the MORTHANE PE 192 type provided by the MORTON THIOKOL Company. As for sample No. 5, its interlayer is a film with a polyvinyl chloride (PVC)

base that is modified as described in U.S. Pat. No. 4,382,996. It is a compound comprising, on the one hand, a thermoplastic resin resulting from the copolymerization of 80% to 98.5% by weight of vinyl chloride, of 1% to 10% of glucydyl methacrylate, and of 0.5% to 10% of ethylene and further, on the other hand, of 10% to 40% by weight of a plasticizer. Its thickness is 1.15 mm.

Samples 6 and 7 are standard insulating glazings, only their air space is reduced to 3 mm for reasons of room and their thicknesses selected for acoustical reasons.

The resins used as interlayers are selected for their different dampings. Now, with reference to FIG. 5, the method will be described that makes it possible to make the selection of a resin that can be used within the context of the present invention.

The energy acquired by an object subjected to a shock produces a vibration phenomenon and then immediately after the shock, the object then becomes free and vibrates according to its own modes. A vibration frequency is associated with each mode. The amplitude of the vibration depends on the initial excitation, i.e., on the spectral component of the shock (amplitude of the shock at the studied frequency) and on the impact zone of the shock, the value of normal deformation being more or less depending on whether the shock occurs at a vibration node or antinode.

So that a proper mode is excited, it is necessary that:
(1) the deformation caused at the point of impact not be located on a vibration node of the mode,
(2) the shock energy spectrum have a component at the resonant frequency of the mode.

This latter condition is also met and, for a bar that is free at its ends, for example, it is enough to tap at one of the ends to excite all modes.

Actually, only the first ten modes, at most, can be measured. The vibratory energy acquired by a shock is dissipated over time and faster the more damped the material.

For a given material, the modes are dissipated faster the higher the associated resonant frequency, so that after a certain time, and over a certain period, only the first mode remains.

The principle of the measurement consists, therefore, in performing the analysis of the vibration frequencies of a bar subjected to a shock and in locating the position of the resonant frequencies (frequencies for which the vibration amplitude is clearly larger than in the rest of the spectrum).

To perform the measurement, as shown in FIG. 5, bars 20 are successively used that are 9 cm long and 3 cm wide, first of a glass 4 mm thick, then of a 4×4 laminated glass, in which glass sheets 4 millimeters thick are assembled in a layer X millimeters thick of the resin to be tested.

Bar 20 rests on two foam supports 21, placed approximately at the vibration nodes of the first mode (fundamental mode) of dynamic bending of the bar. The latter is excited by a shock exerted by striking one of its free ends with a small object 22, such as a ruler.

The transient response of the bar to this excitation is picked up by a microphone 23, which is placed on a support 24, very close to the surface of bar 20, in its middle (pressure antinode). The time signal picked up by microphone 23 is amplified by amplifier 25, and then frequency analyzed by a Fourier analyzer 26.

Generally, about ten tests are performed for each same bar 20, to reduce the influence of outside noises.

As can be seen in FIGS. 6 and 7, the curves obtained, which represent amplitude A of the vibrations as a function of their frequency, respectively for a monolithic glass bar and for a laminated glass bar comprising a resin to be tested within the context of this invention, make it possible to detect with precision the resonant frequency of the fundamental mode of the bending vibration (critical frequency). In the examples shown, the critical frequency of the laminated glass bar is 2472 Hz, as shown in FIG. 7.

The test which has just been described and which is very simple to use makes it possible to determine the flectural damping $\nu$ of bar 20, which is defined as the $\Delta f/f_c$ where $\Delta f$ represents the difference of the frequencies corresponding to an amplitude equal to that of the critical frequency $f_c$, divided by $\sqrt{2}$.

The results of the acoustic transmission loss measurements appearing in Table I make it possible to calculate for each frequency the positive or negative difference between the reference figure (column 0) and the loss of a given product (No. 1 to 7).

For each glazing, the difference is then calculated of the extreme values of these differences calculated at each frequency.

Thus, for example for glazing No. 1, the largest positive value that appears for 1000 Hz is +5. The smallest negative value, at 2500 Hz as at 3150 Hz is −8, the difference of the extremes will therefore be 5−(−8)=13 and the corresponding deviation relative to the reference figure is, here, therefore 6.5 dB. Actually, it is possible to offset the reference curve so that the positive and negative deviations have the same absolute value, here 6.5 dB. Thus it is seen that when a "difference of the extremes" which has the value E for a given glazing is mentioned, this means that the acoustic transmission loss of the glazing in question does not differ for any frequency by more than E/2 decibels from the reference factor.

For each glazing, the average of the differences in question has also been calculated, as shown in Table 2 below.

Moreover, in each case the standard deviation, $\sigma$, of all these differences has been calculated. This value is very interesting because it accounts for the emergence of certain frequencies in the noise spectrum as is perceived in a moving vehicle. When the spectrum is even, the standard deviation remains small, on the other hand, if this spectrum is very disturbed, $\sigma$ will increase.

TABLE 2

|   | Difference of the Extremes E (dB) | Average of the Differences (dB) | Standard Deviation of the Differences $\sigma$ (dB) | Damping $\nu$ % |
|---|---|---|---|---|
| 1 | 13 | −2.2 | 4.6 | — |
| 2 | 13 | −0.6 | 4.2 | 12 |
| 3 | 13 | −1.2 | 4.2 | 16 |
| 4 | 10 | −0.1 | 3.0 | 19 |
| 5 | 10 | −0.1 | 3.3 | 20 |
| 6 | 4 | −1.0 | 1.1 | — |
| 7 | 5.5 | −0.6 | 1.7 | — |

Table 2 shows the results for the seven examples under consideration. The dampings measured on the resins used in laminates 2, 3, 4 or 5 have also been shown.

These results show, on the one hand, the very good behavior of the insulating glazings. They deviate very little from the target-curve (average of the differences −1.0 and −0.6 dB respectively) but especially, the standard deviation of their differences is remarkably small (respectively 1.1 and 1.7 dB). The two examples cited (glazings 6 and 7) are not limiting, the good behavior of other combinations, such as for example 3.2 mm and 3.9 mm, has also been noted.

The 5 mm monolithic glazing appears mediocre.

With laminated glazings, the determining influence of the damping on the standard deviation of the differences is especially noted, i.e., actually on the dispersion of these differences, therefore on the emergence of annoying frequencies in the resulting noise spectrum. The thermoplastic polyurethane resin, glazing No. 2, with a damping $v$ of 12% provides high differences of the extremes E and a high standard deviation (respectively 13 dB and 4.2 dB). On the other hand, with the same resin, polyvinyl butyral, by varying only the temperature, which goes from 25° C. (glazing No. 3) to 35° C. (glazing No. 4), a 28% improvement in the $\sigma$ is found. This improvement is due solely to the variation of the damping at the coincidence frequency which goes from 16% to 19% when the temperature of the PVB rises.

In practice, however, it is necessary to have a product which keeps its properties within a considerable range of temperatures.

The modified PVC of laminate No. 5 shows high damping properties (20%) in a very wide temperature range, it therefore gives a very satisfactory response to the problem of the acoustical protection of a vehicle from aerodynamic noises.

Further, the generalized use of laminated glazings on a vehicle offers obvious additional advantages: on railroad cars, it eliminates the danger of throwing of fragments in case of sudden breaking as would be the case with a tempered glass and, on an automobile, it is a break-in retarder, i.e., someone breaking into a parked vehicle to commit a theft would need a clearly longer time if all the windows were laminated.

Thus, it can be seen that the invention proposes a general solution to the problem of acoustical insulation from aerodynamic noises of a land vehicle at high speed. This solution materializes in two types of adapted glazings, one which belongs to the family of glazings with improved heat insulation, an insulating glazing with an air space, the other-to the family of break-in retarding glazings, a laminated glazing with a plastic interlayer.

Obviously, numerous modifications and variations of the present invention are possible in light of the above teachings. It is therefore-to be understood that within the scope of the appended claims, the invention may be practiced otherwise than as specifically described herein.

What is claimed as new and desired to be secured by letters patent of the United States is:

1. An acoustic protective glazing for a vehicle comprising:
   a first glass sheet;
   a second glass sheet;
   said first and second glass sheets positioned so as to form an interlayer region between said first and second glass sheets, wherein the interlayer region. Comprises a plastic interlayer sheet having a flextural damping greater then 0.15;
   wherein at least one of the thickness of at least one of said glass sheets and the composition and dimensions of said interlayer region are chosen such that said protective glazing attenuates frequencies higher than 800 Hz and has an acoustic transmission loss which does not differ for any frequency by more than 5 decibels from an increasing reference figure of 9 dB per octave up to 2000 Hz and of 3 dB per octave at higher frequencies, and wherein one of said first and second glass sheets each has a thickness less than 3 mm and another of said first and second glass sheets has a thickness less than 4 mm.

2. The acoustic protective glazing according to claim 1, wherein the thickness of the first and second glass sheets is identical and equal to about 2.2 mm.

3. The acoustic protective glazing according to claim 1, wherein the plastic interlayer sheet comprises a compound having as a base, a thermoplastic resin resulting from the copolymerization of 80% to 98.5% by weight of vinyl chloride, of 1% to 10% of glucydyl methacrylate and of 0.5% to 10% of ethylene, and further comprises 10% to 40% by weight of a plasticizer.

4. An acoustic protective glazing for a vehicle comprising:
   a first glass sheet;
   a second glass sheet;
   said first and second glass sheet positioned so as to form an interlayer region between said first and second glass sheets;
   wherein at least one of the thickness of at least one of said glass sheets and the composition and dimensions of said interlayer region are chosen such that said protective glazing attenuates frequencies higher than 800 Hz and has an acoustic transmission loss which does not differ for any frequency by more than 5 decibels from an increasing reference figure of 9 dB per octave up to 2000 Hz and of 3 dB per octave at higher frequencies, and wherein said first and second glass sheets each have a thickness of 2.2 mm.

5. The acoustic protective glazing according to claim 4, wherein the interlayer region comprises a plastic interlayer sheet having a flextural damping greater than 0.15.

6. An acoustic protective glazing for a vehicle comprising:
   a first glass sheet;
   a second glass sheet;
   said first and second glass sheet positioned so as to form an interlayer region between said first and second glass sheets;
   wherein at least one of the thickness of at least one of said glass sheets and the composition and dimensions of said interlayer region are chosen such that said protective glazing attenuates frequencies higher than 800 Hz and has an acoustic transmission loss which does not differ for any frequency by more than 5 decibels from an increasing reference figure of 9 dB per octave up to 2000 Hz and of 3 dB per octave at higher frequencies, wherein at least one of said first and second glass sheets has a thickness less than 3 mm, and wherein the interlayer region comprises a plastic interlayer sheet having a flextural damping greater than 0.15, the plastic interlayer sheet comprising a compound having as a base, a thermoplastic resin resulting from copolymerization of 80% to 98.5% by weight of vinyl chloride, of 1% to 10% of glucydyl methacrylate and of 0.5% to 10% of ethylene, and further comprises 10% to 40% by weight of a plasticizer.

* * * * *